United States Patent Office 3,364,076
Patented Jan. 16, 1968

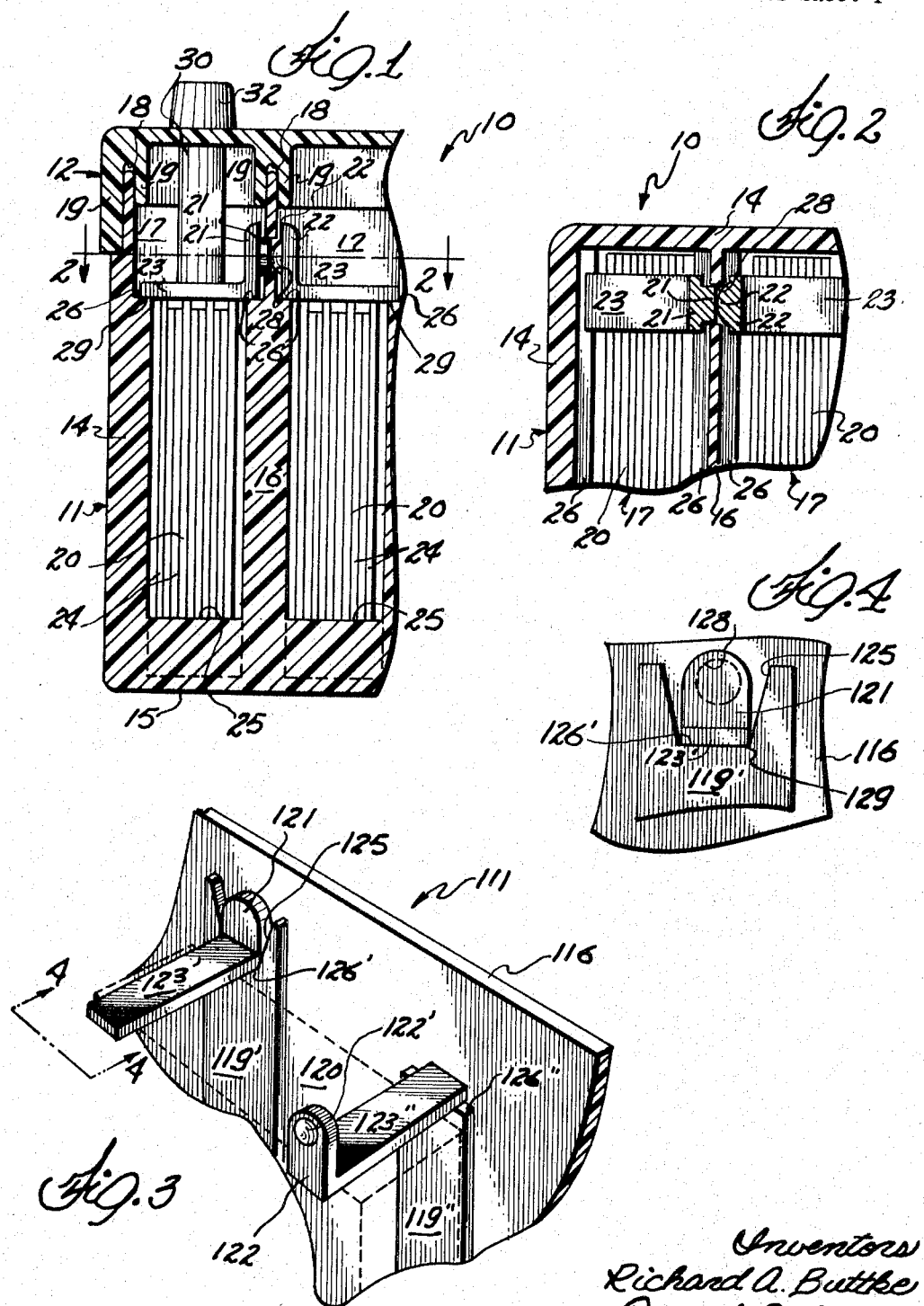

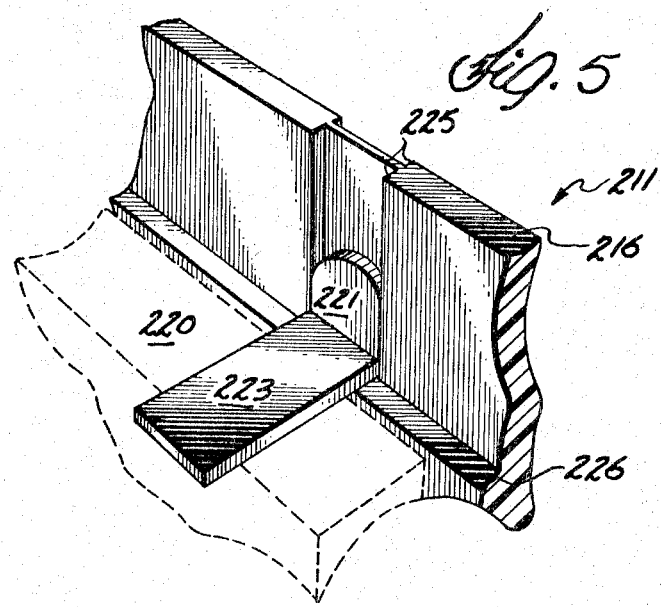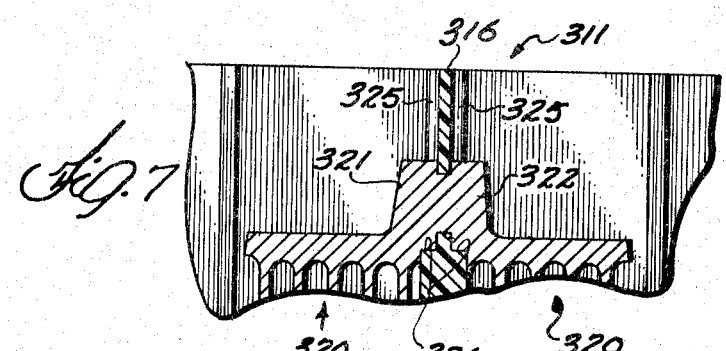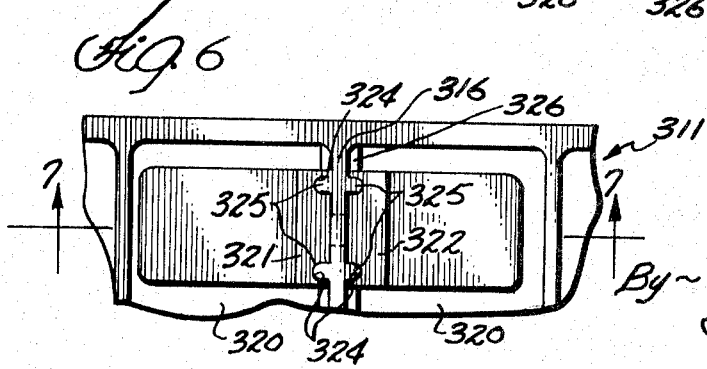

3,364,076
ALIGNING ARRANGEMENT FOR MULTICELL BATTERIES
Richard A. Buttke, Milwaukee, and Daniel Orlando, Brookfield, Wis., assignors to Globe-Union Inc., Milwaukee, Wis., a corporation of Delaware
Filed Apr. 2, 1965, Ser. No. 445,066
9 Claims. (Cl. 136—134)

ABSTRACT OF THE DISCLOSURE

A battery assembly utilizing reference means in the battery casing walls which cooperate with portions of the straps to support the individual electrode assemblies and accurately locate the connector portions vertically and/or horizontally so that, for the first time, lead-acid battery assembly may be truly automated. The cooperating portions may be shelves, V-shaped slots, or ribs and grooves, for example, and are preferably formed in the electrode straps and casing walls.

The present invention relates in general to storage batteries and, more specifically, to a storage battery which includes a casing, a cover and a plurality of electrode assemblies, selected parts on the electrode assembly and casing being adapted to guide the electrode assemblies in adjacent cells into desired relative positions and to support the assemblies so that intercell connections may readily be formed therebetween.

One of the main requirements for the proper automatic formation of intercell connections in multicell batteries is that the projections of electrode assemblies in adjacent cells be properly aligned so that connections may be readily and effectively formed therebetween. Such alignment is presently accomplished manually with the aid of complex jigs. Consequently, it has been desired to design a battery casing which guides the electrode assemblies in adjacent cells into proper alignment and which supports the electrode assemblies within the cells so that optimum conditions are provided and human error is eliminated in forming connections therebetween.

A primary object of the present invention is to provide a new and improved battery casing. More specifically, an object is to provide a new and improved battery casing which facilitates the assembly of the battery. In this connection, an object is to provide such a battery casing which facilitates the welding of intercell connections.

A more specific object is to provide a new and improved battery casing which is designed to guide electrode assemblies in adjacent cells into desired relative positions. Further, it is an object to provide such a battery casing which also supports the electrode assemblies subsequent to insertion thereof within the battery cells.

In view of the foregoing, it is an object of the present invention to provide a storage battery casing which provides optimum welding conditions. A related object is to provide such a battery casing which eliminates human error with respect to the forming of intercell connections.

A general object of the present invention is to provide a new and improved battery casing characterized in its simplicity, economy and compactness.

In an exemplary arrangement of the present invention, a battery casing is provided which has side walls, inner walls and a bottom wall defining a plurality of cells which are adapted to receive electrode assemblies. The casing is designed to guide the electrode assemblies in adjacent cells into desired relative positions and to support the electrode assemblies subsequent to the insertion thereof within the cells so that intercel connections may be readily and effectively formed therebetween.

Other objects and advantages of the present invention will become apparent upon reading the attached detailed description, taken in connection with the drawings, wherein:

FIGURE 1 is a fragmentary, sectional side elevational view of a storage battery employing a battery casing constructed in accordance with the teachings of the present invention;

FIG. 2 is a fragmentary sectional view taken substantially along line 2—2 in FIG. 1;

FIG. 3 is a fragmentary perspective view of a second embodiment of a battery casing constructed in accordance with the teachings of the present invention;

FIG. 4 is an enlarged view taken substantially along line 4—4 in FIG. 3;

FIG. 5 is a fragmentary perspective view of a third embodiment of a battery casing constructed in accordance with the teachings of the present invention;

FIG. 6 is a fragmentary top plan view of a fourth embodiment of a battery casing constructed in accordance with the teachings of the present invention; and FIG. 7 is a fragmentary sectional view taken substantially along line 7—7 in FIG. 6.

While the invention has been shown and will be described in some detail with reference to particular, exemplary embodiments thereof, there is no intention that the invention be limited to such detail. Quite to the contrary, it is intended here to embrace all modifications, alternatives and equivalents falling within the spirit and scope of the invention as defined by the appended claims.

Referring now to the drawings and more specifically to FIGS. 1 and 2, a portion of a storage battery 10 is shown which employs a casing 11 constructed in accordance with the teachings of the present invention. The casing 11 includes outer side walls 14, a bottom wall 15 and a plurality of inner walls 16 which separate and define battery cells 17 within the casing, two such cells 17 being disclosed in FIGS. 1 and 2. Additionally, it will be readily appreciated that the casing 11 may be provided with any desired number of inner cell walls 16 and thus may be provided with any desired number of cells 17.

A cover member 12, of the type now generally known as a one-piece cover, is secured to the battery casing 11 for providing an enclosed battery. The upper edges of the outer side walls 14 and the inner cell walls 16 of the casing 11 communicate with channels or lip wells 18 defined by ribs 19 formed in the lower surface of the cover member 12. Preferably, the upper edge portions of the walls 14 and 16 of the casing 11 are cemented, with a suitable sealant, in place within the lip wells 18 during assembly of the battery to prevent any leakage of electrolyte between adjacent cells or to the exterior of the battery.

Each of the battery cells 17 contains an electrode assembly 20 having a pair of upwardly extending terminal posts 21 and 22 provided at opposite ends thereof as viewed in FIGS. 1 and 2. The terminal posts are electrically connected to electrode assembly cell plates through connecting lugs or straps 23, the cell plates extending downwardly from the straps into the cells 17. Additionally, protuberances or bosses 21′ and 22′ are formed integrally with the terminal posts. The protuberances are adapted to be received within apertures 28 provided in the inner cell walls 16 so that terminal posts of elecmtrode assemblies in adjacent cells may be connected together through the apertures, such as by welding.

In accordance with the present invention, the casing 11 is designed to vertically align electrode assemblies in adjacent cells 17 so that intercell connections may readily and effectively be formed therebetween. More specifically, the casing is designed to vertically align protuberances on terminal posts of electrode assemblies in adjacent cells relative to a common aperture 28. Moreover, the casing 11 is designed to support the electrode assemblies 20 subsequent to the insertion thereof within the cells. To accomplish these results, the outer side walls 14 and the inner cell walls 16 are recessed or have shelves 26 formed therein upon which the ends of the straps 23 rest in supporting engagement. In other words, shelves 26 are formed around the periphery of each cell 17 for supporting an electrode assembly and for vertically aligning the electrode assembly relative to a corresponding electrode assembly in the next adjacent cell so that an intercell connection may readily and effectively be formed therebetween. Additionally, ribs 25 are formed in the bottom wall 15 of each cell 17 which extend upwardly therefrom and which engage the bottoms of the electrode assembly cell plates which may aid in supporting and vertically aligning the associated electrode assembly. However, since the surfaces of strap 23 are more precise dimensionally, it may be preferred to provide slight clearance above ribs 25. For the purpose of allowing the electrode assemblies 20 to be readily inserted in the cells 17, the casing 11 is designed so that the portion of each cell above the associated shelf 26 is sufficient in width to receive an electrode assembly.

In the construction of a battery, electrode assemblies are initially inserted in the cells 17. Subsequently, the terminal posts 21 and 22 of assemblies in adjacent cells are suitably secured together, such as by welding, to form intercell connections. This may, for example, be accomplished by moving heating electrodes into pressing engagement with the terminal posts 21 and 22 so that the protuberances 21' and 22' are welded together.

While in the exemplary arrangement the casing 11 is adapted for the formation of intercell connections through apertures 28 in the inner cell walls 16, the invention is not intended to be limited to the formation of such intercell connections. Quite to the contrary, the invention is intended to be applicable to casings adapted for any other type of intercell connections, e.g., up-and-over intercell connections.

In view of the foregoing, it will be readily apparent that a battery casing 11 has been provided which facilitates the formation of intercell connections since the shelves 26 and the ribs 25 cooperate to vertically align the welding protuberances on terminal posts 21 and 22 of electrode assemblies in adjacent cells 17. Additionally, it will be readily apparent that the casing 11 facilitates the formation of a sturdier battery since the electrode assemblies are supported by the shelves 26 and the ribs 25 subsequent to the insertion of the electrode assemblies within the cells and the formation of intercell connections therebetween.

Referring to FIGS. 3 and 4, a portion of a second embodiment of a battery casing 111 is shown which is constructed in accordance with the teachings of the present invention and which is a modification of the construction shown in FIGS. 1 and 2. In this embodiment, a pair of support columns 119' and 119" are associated, in spaced relationship with one another, with each inner cell wall 116 of the casing 111. As will be apparent, the columns 119' and 119" may be formed integrally with the cell wall 116 or may be formed separately and suitably secured to the cell wall. The supporting column 119' is provided with a substantially V-shaped guide slot 125 which terminates in a supporting shelf 126'. This supporting column is adapted to cooperate with a terminal post 121 and associated connecting strap 123' of an electrode assembly to vertically and horizontally align the terminal post 121 relative to a correspondingly aligned terminal post of an electrode assembly (not shown) in the next adjacent battery cell. More specifically, protuberances on terminal posts of the electrode assemblies 120 in the adjacent cells are aligned relative to an interconnecting aperture 128 provided in the cell wall 116. Moreover, since one end of the strap 123' rests upon the shelf 126' of the column 119', it follows that the electrode assembly 120 is partially supported by the column 119' subsequent to the insertion of the assembly in the battery cell. For the purpose of engaging and supporting the opposite end of the strap 123' to aid in supporting the assembly 120, a column (not shown) corresponding to the column 119" may be provided on the cell wall opposite the disclosed wall 116. The column 119" is provided for engaging and supporting one end of a strap 123" on shelf 126" to aid in supporting the assembly 120, whereas a column (not shown) corresponding to column 119' may be provided on the opposite cell wall for cooperating with a terminal post 122 and the strap 123" to vertically and horizontally align the post 122 and an associated protuberance 122' and to aid in supporting the assembly 120.

Since intercell connections are not formed through outer side walls (not shown) of the casing 111, columns corresponding to column 119" may be associated therewith for engaging and supporting the ends of connection straps of associated electrode assemblies to aid in supporting the assemblies.

In view of the foregoing, it will be readily apparent that the casing 111 likewise facilitates the forming of intercell connections since terminal posts of electrode assemblies in adjacent cells and associated protuberances are vertically and horizontally aligned relative to each other by columns corresponding to column 119'. Additionally, it will be readily apparent that this casing also provides for a sturdier battery construction since the electrode assemblies are supported by supporting columns corresponding to columns 119' and 119" subsequent to the insertion of the electrode assemblies within the cells and the formation of the intercell connections.

Referring to FIG. 5, a portion of a third embodiment of a battery casing 211 is shown which likewise is constructed in accordance with the teachings of the present invention and is a modification of the embodiments shown in FIGS. 1-4. In this embodiment, a slot or groove 225 is provided in each side of each inner cell wall 216. Each slot 225 is adapted to slidably receive a terminal post 221 associated with an electrode assembly 220. It will be readily apparent that side walls of each slot 225 horizontally align the associated terminal post 221 relative to a terminal post in a slot 225 on the opposite side of the cell wall. On the other hand, the bottom wall of the slot 225 engages the associated end of a connecting strap 223 to aid in supporting the associated electrode assembly 220 and to vertically align the terminal post 221 relative to the terminal post in the slot 225 on the opposite side of the cell wall. Recesses or shelves 226 may also be formed in each side of each cell wall coplanar with the bottom walls of slots 225 provided therein for engaging the associated ends of connecting straps 223 to aid in supporting the electrode assemblies 220 and to aid in vertically aligning the terminal posts 221. Corresponding recesses or shelves may be provided in the outer casing walls (not shown) for aiding in the supporting of associated electrode assemblies. With this arrangement, the formation of effective intercell connections is likewise facilitated and a sturdier battery construction is provided.

A portion of a fourth embodiment of a battery casing 311 is shown in FIGS. 6 and 7. This embodiment is a modification of the prior embodiments and is also constructed in accordance with the teachings of the present invention. With this arrangement, pairs of ribs 325 are formed on opposite sides of each cell wall 316 which are adapted to cooperate with grooves 324 provided in terminal posts 322 and 321 of associated electrode assemblies 320 to horizontally align the terminal posts relative to each other. For the purpose of vertically aligning the terminal posts 321 and 322 and for the purpose of supporting the electrode assemblies 220 subsequent to the insertion thereof within the battery cells and the formation of intercell connections, recesses or shelves 326 are formed in opposite sides of each cell wall 316. Thus, the disclosed casing 311 also facilitates the formation of effective intercell connections and the formation of a sturdy battery.

To realize the full benefits of the instant invention, the various components, including the casings 11, 111, 211 and 311, covers 12, and electrode assemblies 20, 120, 220 and 320 should be made with substantial precision. Heretofore, this has presented no problem with respect to casings and covers which are molded or formed in relatively precise molds and have known and relatively close tolerances. However, conventional electrode assemblies made with precast straps and assembled by manual burning techniques exhibit rather wide dimensional tolerances. Thus, important additional benefits are derived from the instant invention if the electrode assemblies are made by a so-called cast-on-strap method. One preferred method of forming a cast-on-strap is disclosed in detail in U.S. Patent No. 3,087,005, issued Apr. 23, 1963.

Irrespective of the method employed in forming the electrode assemblies, jigs or other means must be employed to assure a predetermined relationship between the individual plates 24, the strap 23 and the posts 21 or 22.

Also, irrespective of the method used to make the electrode assemblies 20, 120, 220 and 320, the assembly should have certain dimensionally controlled reference surfaces in order to cooperate with corresponding reference surfaces already described in the casings 11, 111, 211 and 311. Thus, in the embodiment of FIGS. 1 and 2, the strap surfaces 29 must be dimensionally controlled with respect to the post and particularly those portions of the post which join with adjacent electrode assemblies and form seals with the cell walls.

For optimum performance of the embodiment of FIGS. 3 and 4, both the bottom surfaces 129 and the side edges of those surfaces should be stable and controlled. The same requirements are applicable in the other embodiments.

As is well known, when intercell connections are made through the wall as shown in the illustrated embodiments, the first and last electrode assemblies will, nevertheless, employ a somewhat conventional post 30 which may have an enlarged external post 32 burned thereon.

In view of the foregoing, it will be apparent that battery casing constructions have been disclosed which allow for the formation of effective intercell connections and a sturdy battery. Additionally, it will be appreciated that the disclosed casings are merely illustrative of specific embodiments of the invention and that the invention is intended to cover the modifications and combinations of the disclosed casing designs falling within the scope of the appended claims.

What is claimed is:

1. A battery assembly comprising a casing having side wall means, inner wall means, and a bottom wall, said wall means and said wall defining a plurality of adjacent cells, cover means secured in sealing engagement with said side and inner wall means to define a plurality of cell enclosures, said inner wall means comprising a plurality of walls of a unitary structure, each having an aperture therethrough, said aperture being displaced from said cover means, a plurality of electrode assemblies, one such electrode assembly being disposed in each of said cells, said electrode assemblies having transverse electrically conductive strap means secured to the upper portion thereof and extending outwardly therefrom, each of said strap means having a connector portion, the connector portions of adjacent electrode assemblies being electrically connected together through said apertures in said walls, and shelf means disposed in said wall means, said strap means resting on said shelf means whereby said electrode assemblies extend downwardly therefrom and said connector portion is accurately positioned in said cell enclosure for connection of said strap means through said apertures.

2. The battery assembly according to claim 1 wherein said shelf means and said strap means cooperate to support said electrode assemblies at predetermined fixed positions with respect to said casing.

3. The battery assembly according to claim 1 wherein said shelf means are formed adjacent said apertures to support said connector portions in vertical alignment with said apertures.

4. The battery assembly according to claim 1 wherein said shelf means are formed adjacent said apertures to support said connector portions in horizontal alignment with said apertures.

5. The battery assembly according to claim 1 wherein said shelf means are formed adjacent said apertures and shaped to support said connector portions in both vertical and horizontal alignment with said apertures.

6. The battery assembly according to claim 1 wherein said shelf means include horizontal shelf portions to accurately vertically align said connector portions with said apertures and vertical guide portions to accurately horizontally align said connector portions with said apertures.

7. The battery assembly according to claim 6 wherein said vertical guide portions define surfaces of tapered slots and said horizontal shelf portions define bases of said tapered slots on which the portions of said straps adjacent said connector portions rest.

8. A battery assembly comprising a casing having side wall means, inner wall means, and a bottom wall, said wall means and said wall defining a plurality of adjacent cells, a plurality of electrode assemblies, one such assembly being disposed in each of said cells, cover means secured in sealing engagement with said side and inner wall means to define a plurality of cell enclosures, each of said electrode assemblies having transverse electrically conductive strap means secured to the upper portion thereof and extending outwardly therefrom, said strap means having a connector portion thereof, an opening in each of said inner wall means, said connector portions being connected together through said openings, shelf means disposed in said wall means, said shelf means including a horizontal shelf portion to accurately vertically align said connector portion with said opening and vertical guide portions defining surfaces of a tapered slot to accurately horizontally align said connector portion with said opening, said horizontal portion defining the base of said tapered slot on which the portion of said strap adjacent said connector portion rests, the ends of said strap means opposite said connector portions extending outwardly and resting upon said shelf means, whereby said electrode assembly extends downwardly therefrom and said connector portion is accurately positioned in said cell enclosure and connected to an adjacent electrode assembly.

9. A battery assembly comprising a casing having side wall means, inner wall means, and a bottom wall, said wall means and said wall defining a plurality of adjacent cells, a plurality of electrode assemblies, one such assembly being disposed in each of said cells, cover means secured in sealing engagement with said side and inner wall means to define a plurality of cell enclosures, each of said inner wall means having an opening therethrough, each of said electrode assemblies having transverse electrically conductive strap means secured to the upper portion thereof and extending outwardly therefrom, said strap means having a connector portion thereof connected to an adjacent electrode assembly and shelf means disposed in the wall means, said strap means resting on the shelf means whereby said electrode assembly extends downwardly therefrom and said connector portion is accurately positioned in said cell enclosure and connected to an adjacent electrode assembly, said strap means and said inner wall means being formed with cooperating vertically extending ribs and grooves for horizontally aligning the connector portions and the opening.

(References on following page)

References Cited

UNITED STATES PATENTS

| | | | |
|---|---|---|---|
| 1,874,404 | 8/1932 | Wood | 136—134 X |
| 1,919,902 | 7/1933 | Nyce | 136—134 |
| 2,608,596 | 8/1952 | White | 136—134 X |
| 3,253,962 | 5/1966 | Deprill et al. | 136—134 |
| 598,926 | 2/1898 | Harris et al. | 136—166 |
| 2,218,621 | 10/1940 | Norberg | 136—134 |
| 2,261,597 | 11/1941 | Sutherland | 136—134 X |
| 2,381,140 | 8/1945 | Proctor | 136—134 |
| 2,730,561 | 1/1956 | Cuff et al. | 136—166.2 X |

WINSTON A. DOUGLAS, *Primary Examiner.*

D. L. WALTON, *Assistant Examiner.*